United States Patent
Hu et al.

(10) Patent No.: US 12,261,492 B2
(45) Date of Patent: Mar. 25, 2025

(54) ROTOR STRUCTURE, ELECTRIC MOTOR AND ROTOR MANUFACTURING METHOD

(71) Applicant: GREE ELECTRIC APPLIANCES, INC. OF ZHUHAI, Guangdong (CN)

(72) Inventors: Yusheng Hu, Zhuhai (CN); Bin Chen, Zhuhai (CN); Yong Xiao, Zhuhai (CN); Jinfei Shi, Zhuhai (CN); Xia Li, Zhuhai (CN); Zhidong Zhang, Zhuhai (CN)

(73) Assignee: GREE ELECTRIC APPLIANCES, INC. OF ZHUHAI, Guangdong (CN)

( * ) Notice: Subject to any disclaimer, the term of this patent is extended or adjusted under 35 U.S.C. 154(b) by 0 days.

(21) Appl. No.: 18/017,061

(22) PCT Filed: Jul. 22, 2021

(86) PCT No.: PCT/CN2021/107838
§ 371 (c)(1),
(2) Date: Jan. 19, 2023

(87) PCT Pub. No.: WO2022/127110
PCT Pub. Date: Jun. 23, 2022

(65) Prior Publication Data
US 2023/0308001 A1    Sep. 28, 2023

(30) Foreign Application Priority Data

Dec. 17, 2020 (CN) .......................... 202011503752.1

(51) Int. Cl.
*H02K 1/24* (2006.01)
*H02K 15/023* (2025.01)
(Continued)

(52) U.S. Cl.
CPC ............. *H02K 19/14* (2013.01); *H02K 1/246* (2013.01); *H02K 15/023* (2025.01); *H02K 19/103* (2013.01); *H02K 2213/03* (2013.01)

(58) Field of Classification Search
CPC .... H02K 19/14; H02K 15/0012; H02K 1/265; H02K 1/246; H02K 1/2773; H02K 1/2776; H02K 1/276
See application file for complete search history.

(56) References Cited

U.S. PATENT DOCUMENTS

| 3,758,800 A | 9/1973 | McLaughlin |
| 6,066,904 A * | 5/2000 | Fei .......................... H02K 1/246 310/216.107 |

(Continued)

FOREIGN PATENT DOCUMENTS

| CN | 1447492 A | 10/2003 |
| CN | 1950992 A | 4/2007 |

(Continued)

OTHER PUBLICATIONS

International Search Report for PCT/CN2021/107838 dated Oct. 21, 2021 (7 pages).

(Continued)

*Primary Examiner* — Leda T Pham
(74) *Attorney, Agent, or Firm* — J. Miguel Hernandez; James R. Gourley; Carstens, Allen & Gourley, LLP

(57) ABSTRACT

The present disclosure provides a rotor structure, an electric motor and a rotor manufacturing method. The rotor structure includes a plurality of rotor sheets (100) and a rotating shaft. The rotor sheets (100) are stacked in sequence along an axial direction of the rotor structure. Each of the rotor sheets (100) is provided with a shaft hole (20), a first slot (111), and first filling slots (121) at both ends of the first slot (111). The first slot (111) extends in a direction of a direct axis (3) of the rotor structure and includes slot sections (1110) at opposite (Continued)

sides of the shaft hole (20). The rotating shaft passes through the shaft hole (20) of the plurality of rotor sheets (100). The first slot (111), the first filling slots (121) and the rotating shaft form a first flux barrier layer (101).

20 Claims, 4 Drawing Sheets

(51) Int. Cl.
*H02K 19/10* (2006.01)
*H02K 19/14* (2006.01)

(56) References Cited

U.S. PATENT DOCUMENTS

| | | | | |
|---|---|---|---|---|
| 6,906,448 | B2* | 6/2005 | Yoshino | H02K 21/46 |
| | | | | 310/212 |
| 7,282,829 | B2* | 10/2007 | Jung | H02K 17/18 |
| | | | | 310/211 |
| 10,686,343 | B2* | 6/2020 | Ikäheimo | H02K 1/28 |
| 2003/0090170 | A1* | 5/2003 | Yoshino | H02K 1/246 |
| | | | | 310/216.094 |
| 2003/0184185 | A1 | 10/2003 | Yoshino et al. | |
| 2006/0108888 | A1* | 5/2006 | Jung | H02K 1/26 |
| | | | | 310/211 |
| 2007/0170803 | A1 | 7/2007 | Yabe et al. | |
| 2008/0272667 | A1* | 11/2008 | Ionel | H02K 21/46 |
| | | | | 310/156.83 |
| 2018/0226848 | A1* | 8/2018 | Kolehmainen | H02K 19/14 |
| 2019/0036297 | A1 | 1/2019 | Gloor et al. | |

FOREIGN PATENT DOCUMENTS

| | | |
|---|---|---|
| CN | 108711968 A | 10/2018 |
| CN | 208337260 U | 1/2019 |
| CN | 109525049 A | 3/2019 |
| CN | 110112846 A | 8/2019 |
| CN | 110138117 A | 8/2019 |
| CN | 110149014 A | 8/2019 |
| CN | 110838780 A | 2/2020 |
| CN | 112653265 A | 4/2021 |
| JP | 09163645 A | 6/1997 |
| JP | 2003289656 A | 10/2003 |
| JP | 201022195 A | 1/2010 |
| JP | 2015513297 A | 4/2015 |
| JP | 2016507207 A | 3/2016 |

OTHER PUBLICATIONS

Notification of Formalities for Chinese Patent Application No. 2020115037521 dated Jul. 26, 2022 (2 pages).
Office Action dated Feb. 14, 2022 for Chinese Patent Application No. CN202011503752.1 (9 pages).
Office Action dated Oct. 28, 2021 for Chinese Patent Application No. CN202011503752.1 (9 pages).
Search Report dated Aug. 23, 2021 for Chinese Patent Application No. CN202011503752.1 (2 pages).
Written Opinion of the International Searching Authority for Application No. PCT/CN2021/107838 dated Oct. 15, 2021 (8 pages).
Extended European Search Report for European Application No. 21905043.2 dated Feb. 5, 2024 (6 pages).
Office Action for Japanese Application No. JP 2023-503213 dated Feb. 13, 2024 with English translation (10 pages).

* cited by examiner

ROTOR STRUCTURE, ELECTRIC MOTOR AND ROTOR MANUFACTURING METHOD

CROSS-REFERENCE TO RELATED APPLICATIONS

This application is a U.S. National Stage of International Application No PCT/CN2021/107838, filed on Jul. 22, 2021, entitled Rotor Structure, Electric Motor and Rotor Manufacturing Method and published as WO 2022/127110 A1 on Jun. 23, 2022, which claims priority to Chinese patent application No. 202011503752.1, filed on Dec. 17, 2020, the content of which is hereby incorporated by reference in its entirety. Every patent application and publication listed in this paragraph is hereby incorporated by reference in its entirety, as an example.

TECHNICAL FIELD

The present disclosure relates to the technical field of electric motors, in particular to a rotor structure, an electric motor and a rotor manufacturing method.

BACKGROUND

A self-starting synchronous reluctance motor, based on a synchronous reluctance motor, combines advantages of an asynchronous motor and implements a self-starting by an asynchronous torque generated by rotor conducting bars. Compared with the synchronous reluctance motor, the self-starting synchronous reluctance motor does not use a variable-frequency drive any more, a system loss of the motor is reduced, and the motor efficiency is improved. Compared with the asynchronous motor, the self-starting synchronous reluctance motor can achieve a constant speed operation, a low rotor loss and a high efficiency. Compared with an asynchronous-starting permanent magnet synchronous motor, the self-starting synchronous reluctance motor does not use the permanent magnet material, the cost of the motor is low, and there is no problem of permanent magnet demagnetization.

In the techniques known to the inventors, slots of the self-starting synchronous induction motor are in the shape of straight lines, the rotor center is provided with a shaft hole, and an internal space of the rotor along the d-axis is large, which lead to a low utilization of the rotor space, a high saturation of the rotor part, and a low motor efficiency.

SUMMARY

The main object of the present disclosure is to provide a rotor structure, an electric motor and a rotor manufacturing method.

According to a first aspect of the present disclosure, a rotor structure is provided, including:
 a plurality of rotor sheets stacked in sequence along an axial direction of the rotor structure, each of the plurality of rotor sheets is provided with a shaft hole, a first slot, and first filling slots at both ends of the first slot, the first slot extending in a direction of a direct axis of the rotor structure and including slot sections at opposite sides of the shaft hole; and
 a rotating shaft passing through the shaft hole of the plurality of rotor sheets,
 wherein the first slot, the first filling slots, and the rotating shaft form a first flux barrier layer.

In some embodiments, the rotor structure includes two rotor poles arranged in pair; and/or the rotating shaft is made of a magnetically non-conductive material; and/or an outer peripheral surface of the rotating shaft is cylindrical, or the outer peripheral surface of the rotating shaft includes a part of a cylindrical surface.

In some embodiments, a minimum distance L1 between each slot section and the shaft hole is ranged as: $\sigma \leq L1 \leq 5\sigma$; and/or a minimum distance L2 between each slot section and an adjacent first filling slot is ranged as: $0.8\sigma \leq L2 \leq 2\sigma$, or L2=0, wherein $\sigma$ is a width of an air gap between an inner diameter of a stator and an outer diameter of a rotor in an electric motor including the rotor structure.

In some embodiments, the slot sections and the first filling slots are filled with a same material; or the slot sections are air-filed slots.

In some embodiments, the slot sections are rectangular; and/or a minimum width h1 of the slot sections is ranged as: $0.9h2 \leq h1 \leq 1.1h2$, wherein h2 is a width of the first filling slots adjacent to the slot sections.

In some embodiments, groups of second flux barrier layers are located at opposite sides of the first flux barrier layer, wherein each of the groups of second flux barrier layers includes a plurality of second flux barrier layers arranged in a direction of an quadrature axis of the rotor structure, and the plurality of second flux barrier layers each include a second slot and second filling slots disposed at both ends of the second slot.

In some embodiments, a minimum width h1 of the slot sections is ranged as:

$$\frac{4}{25}L6 \leq \frac{1}{2}h1 \leq \frac{2}{5}L6,$$

wherein L6 is a minimum vertical distance in the direction of the quadrature axis between the second slot of a second flux barrier layer most adjacent to the direct axis in each of the groups of second flux barrier layers and the direct axis; and/or a minimum distance h4 in the direction of the quadrature axis between the second slot of the second flux barrier layer most adjacent to the direct axis in each of the groups of second flux barrier layers and the first slot is ranged as: $L7 \leq h4 \leq 1.65L7$, wherein L7 is a minimum distance in the direction of the quadrature axis between the shaft hole and the second flux barrier layer most adjacent to the direct axis.

In some embodiments, in a same second flux barrier layer, the second slot and the second filling slots are disposed at intervals and a width L3 of each interval is ranged as: $0.8\sigma \leq L3 \leq 2\sigma$, wherein $\sigma$ is a width of an air gap between an inner diameter of a stator and an outer diameter of a rotor in an electric motor including the rotor structure; and/or in a same second flux barrier layer, a difference between a maximum width of each second filling slot and a maximum width of the second slot is smaller than or equal to 10% of the maximum width of the second slot.

In some embodiments, in each of the groups of second flux barrier layers, a minimum distance L5 between two adjacent second flux barrier layers is greater than 1.8h3, wherein h3 is a minimum width, in the direction of the quadrature axis, of the second slot of a smaller second flux barrier layer in the two adjacent second flux barrier layers.

In some embodiments, a width of the second slot gradually increases from the quadrature axis to both ends of the second slot.

In some embodiments, a third flux barrier layer is located at a side of each of the groups of second flux barrier layers away from the first flux barrier layer, wherein the third flux barrier layer includes a third filling slot.

In some embodiments, an angle a of the third filling slot occupied relative to a central axis of the rotor structure is ranged as: $0.05\tau \leq \alpha \leq 0.03\tau$, wherein $\tau=180°/p$, and p is a quantity of pole pairs of the rotor structure.

In some embodiments, in each of the groups of second flux barrier layers, a ratio of a sum of widths of second slots of the plurality of second flux barrier layers to a width between the shaft hole and an outer peripheral surface of the rotor structure is in a range from 0.3 to 0.5.

In some embodiments, both the first filling slots and the second filling slots extend to an outer peripheral surface of the rotor structure; and/or the first filling slots and the second filling slots are both filled with aluminum metal or aluminum alloy.

In some embodiments, openings of the first filling slots and the second filling slots are located at ends of the first filling slots and the second filling slots and at sides adjacent to the direct axis; or openings of the first filling slots and the second filling slots are located in middles of ends of the first filling slots and the second filling slots.

In some embodiments, ends of the first filling slots and the second filling slots each include a beveled edge at a side away from the direct axis, or each include beveled edges at both sides of an end of each of the first filling slots or each of the second filling slots, the beveled edges are connected to edges of openings of the first filling slots and the second filling slots.

In some embodiments, an angle between each of the beveled edges and a slot wall of the first filling slots or the second filling slots connected to the each of the beveled edges is β, and $125° \leq \beta \leq 165°$.

In some embodiments, a width of each of openings of the first filling slots and/or the second filling slots is L4, $0.5\sigma \leq L4 \leq 4\sigma$, σ is a width of an air gap between an inner diameter of a stator and an outer diameter of a rotor in an electric motor including the rotor structure; and/or the width L4 of the each of the openings of the first filling slots and/or the second filling slots is less than a maximum thickness w of the first filling slots or that of the second filling slots.

In some embodiments, a width L4 of each of openings of the first filling slots and/or the second filling slots is ranged as: $0.1w \leq L4 \leq 0.7w$, wherein w is a maximum thickness of the first filling slots or that of the second filling slots.

In some embodiments, in a same second flux barrier layer, an area of the second filling slots in a surface of the each of the plurality of the rotor sheets is greater than 40% of a sum of an area of the second slot and an area of the second filling slots of the second flux barrier layer in the surface of the each of the plurality of the rotor sheets.

In some embodiments, in a same first flux barrier layer, an area of the first filling slots in a surface of the each of the plurality of the rotor sheets is greater than 30% of a sum of an area of the first slot and an area of the first filling slots of the first flux barrier layer in the surface of the each of the plurality of the rotor sheets.

According to a second aspect of the present disclosure, an electric motor is provided, including a stator and the above-described rotor structure.

According to a third aspect of the present disclosure, a rotor manufacturing method for manufacturing the rotor structure is provided, wherein the rotor manufacturing method includes: preparing a rotor core having an outer peripheral surface larger than the outer peripheral surface of the rotor structure, thereby forming temporary bars between openings of filling slots of the rotor structure and the outer peripheral surface of the rotor core; filling the filling slots with a material to be filled and installing end rings; and removing the temporary bars to form the rotor structure.

With the technical solutions of the present disclosure, the rotor structure according to embodiments of the present disclosure is the rotor structure of a self-starting synchronous reluctance electric motor, and the rotor structure includes a plurality of rotor sheets stacked in sequence, each of which is provided with a first slot, a first filling slots and a shaft hole. The first slot extends in a direction of a straight axis of rotor structure. The two first filling slots are located at both ends in the extending direction of the first slot. The first slot, the first filling slots and the rotating shaft being inserted into the shaft hole form a first flux barrier layer. The rotor structure according to embodiments of the present disclosure can increase the salient pole difference of the electric motor, improve the output torque of the electric motor, and improve the efficiency of the electric motor, which not only solves the problem of low electric motor efficiency in prior art, but also increases the utilization rate of the rotor core space for manufacturing the rotor structure, which improves the starting capability of the electric motor.

BRIEF DESCRIPTION OF THE DRAWINGS

The drawings of the description, which form a part of the present application, are provided for a further understanding of the present disclosure, and illustrative embodiments and their description of the present disclosure are provided for explaining the present disclosure, and do not constitute any improper limitations to the present disclosure. In the drawings.

The drawings include following reference signs:
100. rotor sheet; 10. rotor pole; 101. first flux barrier layer; 102. second flux barrier layer; 103. third flux barrier layer; 111. first slot; 1110. slot section; 112. second slot; 121. first filling slot; 122. second filling slot; 123. third filling slot; 120. beveled edge; 20. shaft hole; 2. central axis; 3. direct axis; 4. quadrature axis; 200. end ring.

DETAILED DESCRIPTION

It should be noted that the embodiments of the present disclosure and the features in the embodiments can be combined with each other given that there is no contradiction. The present disclosure will be described in detail hereinafter with reference to the drawings and in conjunction with the embodiments.

Figure 1:
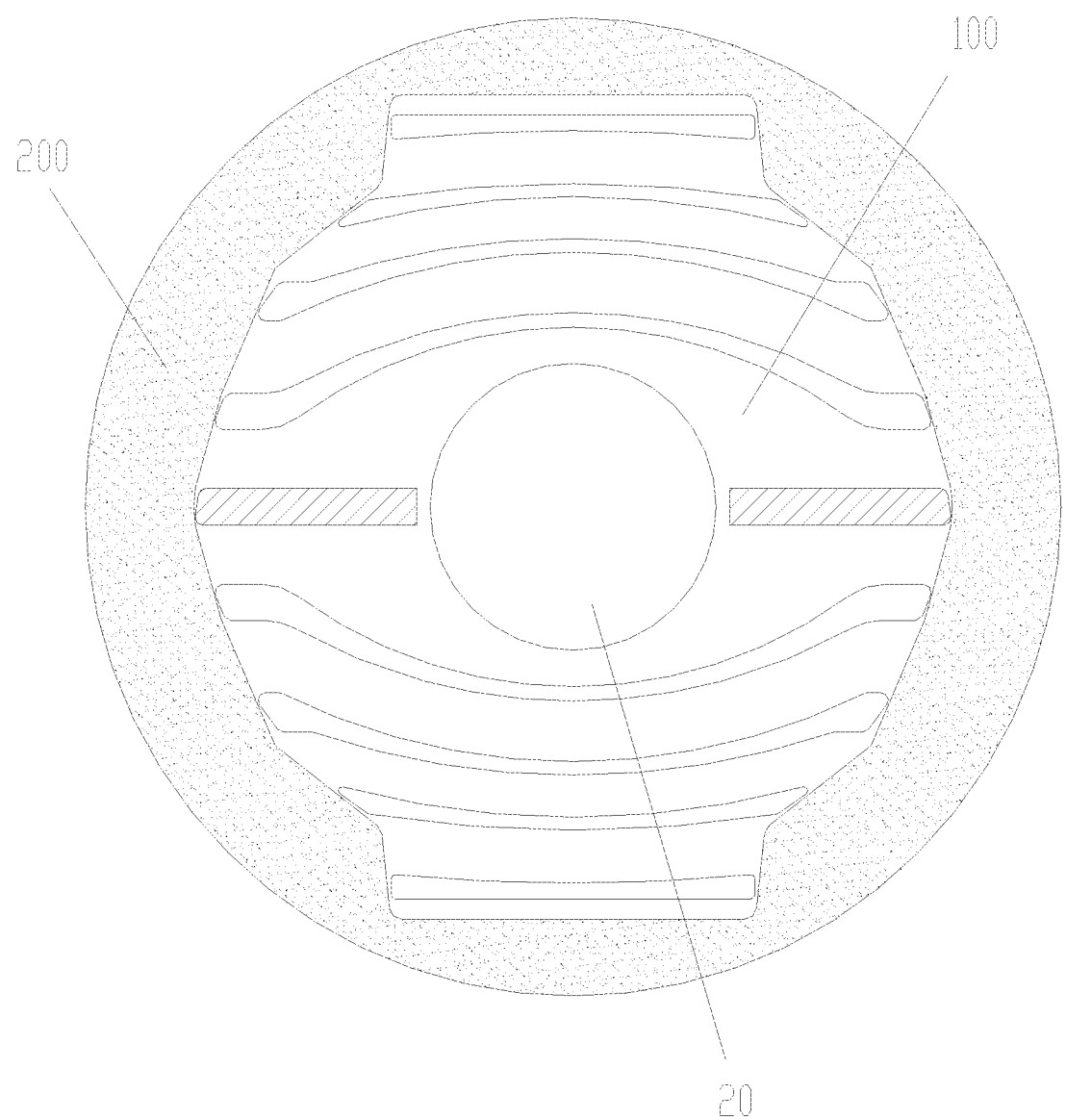
FIG. 1 shows a schematic view of a first embodiment of a rotor structure of the present disclosure.
Figure 2:
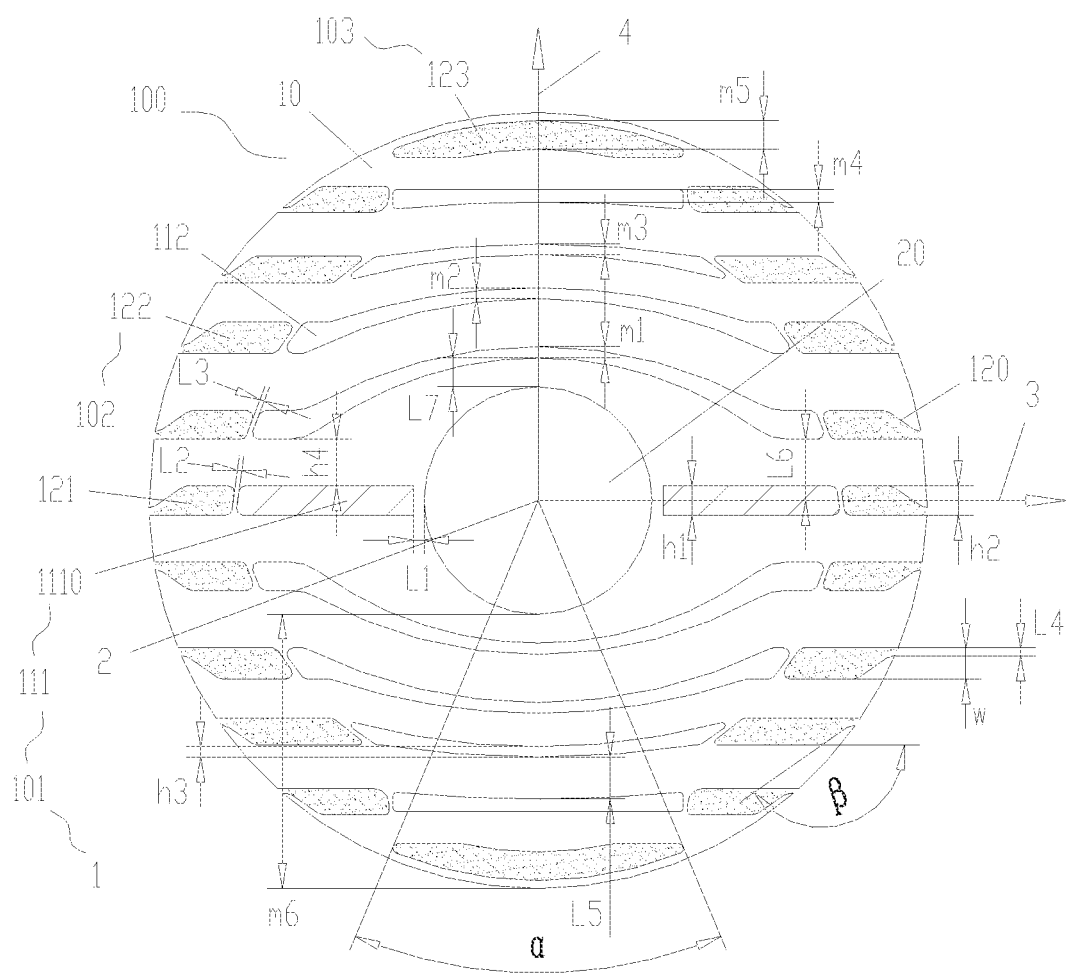
FIG. 2 shows a schematic view of a first embodiment of a rotor sheet in the rotor structure of the present disclosure.
Figure 3:
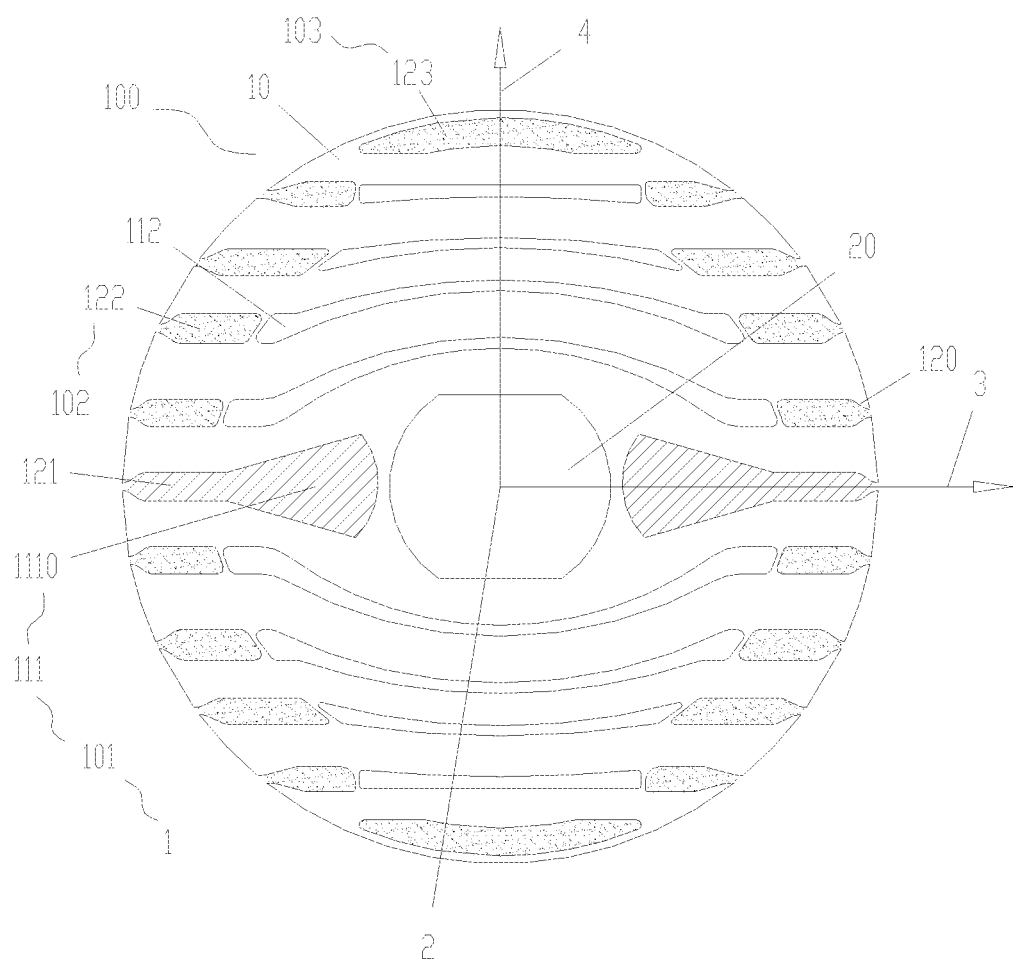
FIG. 3 shows a schematic view of a second embodiment of a rotor sheet in the rotor structure of the present disclosure.

As shown in FIGS. 1 to 3, an embodiment of the present disclosure provides a rotor structure, which includes a rotating shaft and a plurality of rotor sheets 100 sequentially stacked in the axial direction of the rotor structure. Each of the rotor sheets 100 is provided with a shaft hole 20, through which the rotating shaft is to be inserted. The rotor sheet 100 is provided with a first slot 111 and first filling slots 121 at both ends of the first slot 111. The first slot 111 includes slot sections 1110 at opposite sides of the shaft hole 20. The first slot 111, the first filling slots 121, and the rotating shaft being inserted into the shaft hole 20 together form a first flux barrier layer, wherein the first slot 111 extends in a direction of a direct axis 3 of the rotor structure.

The rotor structure according to embodiments of the present disclosure is the rotor structure of the self-starting synchronous reluctance electric motor. The rotor structure includes the plurality of rotor sheets 100 stacked in sequence. The rotor sheet 100 is provided with the first slot 111, the first filling slots 121, and the shaft hole 20. The first slot 111 extends in the direction of the direct axis 3 of the rotor structure. Two first filling slots 121 are located at opposite ends in the extending direction of the first slot 111. The first slot 111, the first filling slots 121, and the rotating shaft being inserted into the shaft hole 20 together form the first flux barrier layer 101. The shaft hole 20 divides the first flux barrier layer 101 into two sectional parts. The rotor structure according to embodiments of the present disclosure can increase the salient pole difference of the electric motor, improve the output torque of the electric motor, and improve the efficiency of the electric motor, which not only solves the problem of low electric motor efficiency in prior art, but also increases the utilization rate of space of the rotor core for manufacturing the rotor structure, which improves the starting capability of the electric motor.

In the self-starting synchronous reluctance electric motor, the direction of the magnetic field of the rotor is a direct axis 3, also known as d-axis, and an quadrature axis 4 has an electrical angle of 90° relative to the direct axis 3, and is also known as q-axis.

The flux barrier, i.e. the magnetic flux barrier, is a structure that blocks the magnetic lines of force from passing through. A magnetic channel is formed between two adjacent magnetic flux barriers in a same rotor pole 10. The magnetic flux barrier is formed by an air-filled hollow slot or other magnetically non-conductive materials filled in the slot.

In particular, the rotor structure consists of two rotor poles 10 arranged in pair; and/or the rotating shaft is made of a magnetically non-conductive material; and/or an outer peripheral surface of the rotating shaft is cylindrical, or a part of the outer peripheral surface of the rotating shaft is composed of a part of a cylindrical surface.

The rotor structure according to an embodiment of the present disclosure includes two symmetrical rotor poles 10. The rotating shaft being inserted in the shaft hole 20 of the rotor structure is made of a magnetically non-conductive material. At least part of the outer peripheral surface of the rotating shaft is cylindrical. The rotating shaft having the above shape can increase the width of the magnetic channel between the first flux barrier layer 101 and a second flux barrier layer 102 most adjacent to the shaft hole 20.

As shown in FIG. 2, a minimum distance L1 between the slot section 1110 and the shaft hole 20 is ranged as: σ≤L1≤5σ; and/or a minimum distance L2 between the slot section 1110 and its adjacent first filling slot 121 is ranged as: 0.8σ≤L2≤2σ, or L2=0, wherein σ is a width of an air gap between an inner diameter of a stator and an outer diameter of a rotor in the electric motor including the rotor structure.

The slot sections 1110 are located on both sides of the shaft hole 20. In order to ensure the mechanical strength of connecting ribs at the connections between the slot sections 1110 and the shaft hole 20 while maximizing the use of the space of the rotor core, the minimum distance between the slot section 1110 and the rotating shaft is L1, and L1 shall satisfy σ≤L1≤5σ, wherein σ is a width of an air gap between an inner diameter of a stator and an outer diameter of a rotor in the electric motor including the rotor structure.

The minimum distance between the slot section 1110 and its adjacent first filling slot 121 is L2, which shall satisfy 0.8σ≤L2≤2σ or L2=0; that is, the slot section 1110 and its adjacent first filling slot 121 can be separated apart from each other or be connected with each other.

In some embodiments, the slot sections 1110 and the first filling slots 121 are filled with the same material; or the slot sections 1110 are air-filled slots.

When slot sections 1110 are the air-filled slots, the slot sections 1110 and their adjacent first filling slot 121 are disposed at intervals. By controlling the distance L2 between the slot section 1110 and its adjacent first filling slot 121, the mechanical strength of the rotor core can be ensured, and the magnetic flux leakage between the slot section 1110 and the first filling slot 121 can be reduced.

The first flux barrier layer 101 composed of the slot sections 1110, the first filling slots 121 and the magnetically non-conductive rotating shaft is a segmental flux barrier layer. When the slot sections 1110 and the first filling slots 121 are filled with the same filling material and the slot sections 1110 are connected with the first filling slots 121, the first flux barrier layer 101 can increase the salient pole difference of the electric motor. As shown in the following equation (1), the salient pole difference is the difference between the d-axis inductance $L_d$ and the q-axis inductance $L_q$ of the electric motor. A greater salient pole difference can improve a capability of the electric motor to output the torque.

$$T_{em} = \frac{1}{2}p(L_d - L_q)i_s^2 \sin 2\beta = p(L_d - L_q)i_d i_q \qquad (1)$$

In the equation (1), $T_{em}$ is an electromagnetic torque, p is the number of pole pairs of the electric motor, $L_d$ is the d-axis inductance of the electric motor, $L_q$ is the q-axis inductance of the electric motor, $i_s$ is the stator current, $i_d$ is the d-axis electric current of the electric motor, $i_q$ is the q-axis electric current of the electric motor, and β is current angle.

In addition, when the slot sections 1110 in the first flux barrier layer 101 are filled with the same filling material as that filled in the first filling slots 121, the filling slot area in the d-axis can be increased and the d-axis electrical resistance can be reduced. As shown in the following equation (2), $$T_{e\_ave} = \frac{3}{2}\frac{P}{2}\frac{S_{SYNC}V_S^2}{\omega}\left\{\frac{1}{R_{rd}}\left(\frac{L_{md}}{L_{ds}}\right)^2 + \frac{1}{R_{rq}}\left(\frac{L_{mq}}{L_{qs}}\right)^2\right\} \qquad (2)$$

In equation (2), $T_{e\_ave}$ is the average electromagnetic torque, P is the number of pole pairs of the electric motor, $S_{SYNC}$ is the slip, ω is the electrical angular velocity of the electric motor, $V_S$ is the effective value of the voltage at the input, $R_{rd}$ and $R_{rq}$ are the d-axis electrical resistance and the q-axis electrical resistance of the rotor, respectively, $L_{md}$ and $L_{mq}$ are the d-axis magnetizing inductance and the q-axis magnetizing inductance of the stator, respectively, $L_{ds}$ and $L_{qs}$ are the d-axis leakage inductance and the q-axis leakage inductance of the stator, respectively.

Since the d-axis leakage inductance $L_{ds}$ and the q-axis leakage inductance $L_{qs}$ of the stator are close, while the d-axis magnetizing inductance $L_{md}$ of the stator is far greater than the q-axis magnetizing inductance $L_{mq}$ of the stator, so $$\left(\frac{L_{md}}{L_{ds}}\right)^2 \gg \left(\frac{L_{mq}}{L_{qs}}\right)^2.$$

Therefore, reducing the d-axis electrical resistance $R_{rd}$ is a more effective way to raise the average electromagnetic torque $T_{e\_ave}$ during starting the electric motor. The slot sections 1110 in the first flux barrier layer 101 are filled with the same material as that filled in the first filling slots 121, which increases the area of the filling slots in the d-axis and reduces the d-axis electrical resistance, thereby increasing the average electromagnetic torque $T_{e\_ave}$ during starting the electric motor and improving the starting capability of the electric motor.

As shown in FIG. 2, the slot section 1110 is rectangular; and/or a minimum width h1 of the slot section 1110 is ranged as: 0.9h2≤h1≤1.1h2, wherein h2 is a width of the first filling slot 121 adjacent to the slot section 1110.

In some embodiments, the shape of the slot section 1110 is rectangular or in other shapes.

Specifically, the minimum width of the slot section 1110 is h1, and the maximum width of the first filling slot 121 adjacent to the slot section 1110 is h2, and h1 and h2 shall satisfy 0.9h2≤h1≤1.1h2, so as to increase the area of the magnetically conducting channel extending in the direction of the direct axis 3 and adjacent to the slot sections 1110, reduce the magnetic reluctance of the magnetic circuit of the rotor structure, and make the magnetic circuit of the rotor part more smooth.

As shown in FIG. 2, opposite sides of the first flux barrier layer 101 each are provided with a group of second flux barrier layers 102. Each group of second flux barrier layers 102 includes a plurality of second flux barrier layers 102 arranged in a direction of a quadrature axis 4 of the rotor structure. The second flux barrier layer 102 includes a second slot 112 and second filling slots 122 disposed at both ends of the second slot 112.

The first flux barrier layer 101 is a segmental barrier layer, that is, the first slot 111 of the first flux barrier layer 101 is divided by the shaft hole 20 into two slot sections 1110 in the direction of the direct axis. The plurality of second flux barrier layers 102 are continuous barrier layers, that is, the second slot 112 of the second flux barrier layer 102 is continuous. The plurality second flux barrier layers 102 are located on both sides of the shaft hole 20 and distributed in the direction of the quadrature axis 4.

In some embodiments, the minimum width h1 of the slot section 1110 is ranged as:

$$\frac{4}{25}L6 \le \frac{1}{2}h1 \le \frac{2}{5}L6,$$

wherein L6 is a minimum vertical distance in the direction of the quadrature axis 4 between the second slot 112 of the second flux barrier layer 102 closest to the direct axis 3 in each group of second flux barrier layers 102 and the direct axis 3; and/or a minimum distance h4 in the direction of the quadrature axis 4 between the second slot 112 of the second flux barrier layer 102 closest to the direct axis 3 in each group of second flux barrier layers 102 and the first slot 111 is ranged as: L7≤h4≤1.65L7, wherein L7 is a minimum distance in the direction of the quadrature axis 4 between the shaft hole 20 and the second flux barrier layer 102 closest to the direct axis 3.

The minimum width h1 of the slot section 1110 also satisfies $$\frac{4}{25}L6 \le \frac{1}{2}h1 \le \frac{2}{5}L6,$$

wherein L6 is the minimum vertical distance in the direction of the quadrature axis 4 between the second flux barrier layer 102 closest to the shaft hole 20 and the direct axis 3. This ensures the area of the magnetic channel extending in the direction of the direct axis 3 and adjacent to the slot sections 1110, so as to ensure the smooth magnetic circuit of the rotor structure in the direct axis 3 direction, reduce the saturation of the magnetic flux density of the rotor structure and make the distribution of the rotor structure magnetic flux density more uniform.

The minimum distance in the direction of the quadrature axis 4 between the second slot 112 of the second flux barrier layer 102 closest to the shaft hole 20 in the second flux barrier layers 102 and the slot section 1110 of the first flux barrier layer 101 is h4, and the minimum distance in the direction of the quadrature axis 4 between the shaft hole 20 and the second flux barrier layer 102 closest to the shaft hole 20 is L7, h4 shall satisfy L7≤h4≤1.65L7, so that the smooth magnetic channel between the second flux barrier layer 102 closest to shaft hole 20 and the first flux barrier layer 101 can be ensured.

In some embodiments, in a same second flux barrier layer 102, the second slot 112 and the second filling slots 122 are disposed at intervals and a width L3 of the interval is ranged as: 0.8σ≤L3≤2σ, wherein σ is a width of an air gap between an inner diameter of a stator and an outer diameter of a rotor in the electric motor formed by the rotor structure; and/or in a same second flux barrier layer 102, a difference between a maximum width of the second filling slot 122 and a maximum width of the second slot 112 is smaller than or equal to 10% of the maximum width of the second slot 112.

Each second slot 112 together with its corresponding second filling slots 122 constitutes each second flux barrier layer 102 of the rotor structure, wherein the second slot 112 in each second flux barrier layer 102 is separated from its corresponding second filling slots 122 by intervals, and the width L3 of the interval shall satisfy 0.8σ≤L3≤2σ, wherein σ is a width of an air gap between an inner diameter of a stator and an outer diameter of a rotor in the electric motor including the rotor structure. The second slot 112 and the second filling slots 122 are smoothly connected, and the difference between the maximum width of the second slot 112 and the maximum width of the second filling slot 122 in each second flux barrier layer 102 is smaller than or equal to 10% of the maximum width of the second slot 112, wherein the maximum width of the second slot 112 refers to the maximum dimension of the second slot 112 in the direction of the quadrature axis 4, and the maximum width of the second filling slot 122 refers to the maximum dimension of the second filling slot 122 in the direction of the quadrature axis 4.

In this way, on the one hand, the mechanical strength of the rotor structure can be guaranteed, the magnetic flux leakage between the second slot 112 and the corresponding second filling slots 122 can be reduced, and on the other hand, controlling the width between the second slot 112 and the corresponding second filling slots 122 can reduce the magnetic reluctance of the magnetic circuit of the rotor structure, so that the magnetic channel of the rotor structure can be more smooth.

In some embodiments, in each group of second flux barrier layers 102, a minimum distance L5 between two adjacent second flux barrier layers 102 is greater than 1.8h3, wherein h3 is a minimum width, in the direction of the quadrature axis 4, of the second slot 112 of a smaller second flux barrier layer 102 in the two adjacent second flux barrier layers 102.

The minimum distance between the two adjacent second flux barrier layers 102 in one rotor pole is L5, and the minimum width, in the direction of the quadrature axis 4, of the smaller second flux barrier layer 102 in the two adjacent second flux barrier layers 102 is h3, wherein L5 shall be greater than 1.8h3.

In this way, on the one hand, the manufacturing difficulty of the rotor structure can be reduced, and on the other hand, the distribution uniformity of the magnetic flux density of the rotor structure can be guaranteed, and the saturation of the magnetic flux density of the rotor can be reduced.

In some embodiments, the width of each second slot 112 increases gradually from the quadrature axis 4 to both ends of the second slot 112.

The width of the second slot 112 in each of the second flux barrier layers 102 gradually increases from the middle (i.e., the quadrature axis 4) of the second slot 112 to both ends thereof, and the width of the second slot 112 refers to the dimension of the second slot 112 in the direction of the quadrature axis 4.

As shown in FIGS. 2 and 3, a third flux barrier layer 103 is disposed at a side of each group of second flux barrier layers 102 away from the first flux barrier layer 101, and the third flux barrier layer 103 is composed of a third filling slot 123.

Each rotor pole 10 includes the third flux barrier layer 103. The third flux barrier layer 103 is a continuous barrier layer, located on the side of each group of second flux barrier layers 102 away from the first flux barrier layer 101. The third flux barrier layer 103 includes the third filling slot 123.

Specifically, an angle α of the third filling slot 123 occupied relative to a central axis 2 of the rotor structure is ranged as: $0.05\tau \le \alpha \le 0.3\tau$, wherein $\tau=180°/p$, and p is the number of pole pairs of the rotor structure.

The third filling slot 123 in the third flux barrier layer 103 is an independent filling slot. The third filling slot 123 occupies the angle α relative to the central axis 2 of the rotor structure, and α shall satisfies $0.05\tau \le \alpha \le 0.3\tau$. In some embodiments, α satisfies $0.15\tau \le \alpha \le 0.26\tau$, where τ is the polar distance angle, i.e., $\tau=180°/p$, and p is the number of pole pairs of the rotor.

The third filling slot 123 can not only be used as a part of the third flux barrier layer 103 to improve the salient pole ratio of the electric motor, but also increase the area of the filling slots of the rotor structure of the electric motor, improving the starting capability of the electric motor. However, if the angle α of the third filling slot 123 is too large, the asynchronous torque of the electric motor will be reduced and the starting capability of the electric motor will become poor.

In some embodiments, in each group of second flux barrier layers 102, a ratio of a sum of the widths of the second slots 112 of the second flux barrier layers 102 to the width between the shaft hole 102 and the outer peripheral surface of the rotor structure is in a range from 0.3 to 0.5.

As shown in FIG. 2, one rotor pole 10 in the rotor structure according to the present disclosure includes four second flux barrier layers 102 and one third flux barrier layer 103. In the direction of the direct axis 3 and away from the rotor structure, the widths of the second slots 112 of four second flux barrier layers 102 and the third filling slot 123 of one third flux barrier layer 103 are sequentially m1, m2, m3, m4, and m5. A sum of the minimum dimensions of the second flux barrier layers 102 and the third flux barrier layer 103 in the radial direction of the rotor sheet 100 is (m1+m2+m3+m4+m5). A width between the shaft hole 20 of the rotor sheet 100 and the outer peripheral surface of the rotor sheet 100 refers to the shortest distance from the shaft hole 20 to the outer peripheral surface of the rotor sheet 100, wherein $(m1+m2+m3+m4+m5)/m6=0.3$ to $0.5$.

Choosing a reasonable proportion for each flux barrier layer 1 not only can ensure a sufficient width of the flux barrier layer 1, effectively block the quadrature axis magnetic flux, but also can ensure a reasonable magnetic channel, prevent the magnetic circuit oversaturation, increase the direct axis magnetic flux, and increase the salient pole ratio of the electric motor.

Specifically, both the first filling slots 121 and the second filling slots 122 extend to the outer peripheral surface of the rotor structure; and/or the first filling slots 121 and the second filling slots 122 are both filled with aluminum metal or aluminum alloy.

The first filling slots 121 and the second filling slots 122 in the filling slots of rotor structure are open slots, that is, the openings of the first filling slots 121 and the second filling slots 122 are located in the outer peripheral surface of the rotor sheet 100. In contrast, the third filling slot 123 is a closed slot.

The filling slots includes the first filling slots 121, the second filling slots 122, and the third filling slots 123 filled with an electrically conductive but magnetically non-conductive material, such as aluminum metal or aluminum alloy. The filling material in the filling slots and the end rings 200 arranged at both ends of the rotor structure together form a short circuited connection and constitute a squirrel cage structure. The material of the end ring 200 is the same as the material filled in filling slots. This allows the structure to provide an asynchronous torque during the starting phase of the electric motor to implement the self-starting of the self-starting synchronous reluctance electric motor.

In some embodiments, openings of the first filling slots 121 and the second filling slots 122 are located at the ends of the slots and at sides adjacent to the direct axis 3, or the openings of the first filling slots 121 and second filling slots 122 are located in the middles of the ends of the slots.

As shown in FIGS. 2 and 3, the widths of the openings of the first filling slots 121 and the second filling slots 122 are smaller than the widths of the first filling slots 121 or the second filling slots 122. The openings of the first filling slots 121 and the second filling slots 122 are located at the ends of the corresponding first filling slots 121 and second filling slots 122 adjacent to the outer peripheral surface of the rotor sheet 100 and at the sides of the corresponding first filling slots 121 and second filling slots 122 adjacent to the direct axis 3. Alternatively, the openings of the first filling slots 121 and the second filling slots 122 are located at the ends of the corresponding first filling slots 121 and second filling slots 122 adjacent to the outer peripheral surface of the rotor sheet 100 and located in the middles of the ends.

In some embodiments, the ends of the first filling slots 121 and the second filling slots 122 each include a beveled edge 120 at the side away from the direct axis 3 adjacent thereto, or each include beveled edges 120 at both sides of the end of the first filling slot 121 or the second filling slot 122. The beveled edges 120 are connected to edges of the openings of the corresponding first filling slots 121 and second filling slots 122.

Specifically, the ends of the first filling slots 121 and the second filling slots 122 are each provided with the beveled edge 120 on the side thereof away from the direct axis 3 or on both sides of the middles thereof, and the beveled edge(s) 120 is connected with the openings of the corresponding first filling slots 121 and the second filling slots 122, forming a half-opened slot structure of the first filling slots 121 and the second filling slots 122. By setting the beveled edges 120, the magnetic channels between the first filling slots 121 and the second filling slots 122 adjacent to the outer peripheral surface of the rotor structure become wider, and the direct axis magnetic flux may enter the stator smoothly along the beveled edges 120, so as to reduce the influence of the openings of the first filling slots 121 and second filling slots 122 on the direct axis magnetic flux and to ensure the direct axis inductance. Meanwhile, the beveled edges 120 can also improve the distribution of the magnetic flux, slow down the change of the magnetic flux, reduce the torque ripple caused by the interactions of the stator teeth, and reduce the vibration noise of the electric motor. In addition, the openings can effectively block the quadrature axis magnetic flux, reduce the quadrature axis inductance, increase the inductance difference between the direct axis and the quadrature axis, and improve the electric motor output torque and efficiency.

In some embodiments, an angle between the beveled edge 120 and a slot wall of the first filling slot 121 or the second filling slot 122 connected to the beveled edge 120 is β, and $125°≤β≤165°$. The beveled edge 120 can reduce the influence of the corresponding opening of the first filling slot 121 or the second filling slot 122 on the direct axis inductance, so that the direct axis magnetic lines of force can enter the stator smoothly and produce torque. Meanwhile, the beveled edge 120 can reduce a sudden change of the inductance of the electric motor, and lower the reluctance torque ripple.

As shown in FIG. 2, a width of the opening of the first filling slot 121 and/or that of the second filling slot 122 is L4, wherein $0.5σ≤L4≤4σ$, σ is a width of an air gap between an inner diameter of a stator and an outer diameter of a rotor in the electric motor including the rotor structure; and/or the width L4 of the opening of the first filling slot 121 and/or that of the second filling slot 122 is less than a maximum thickness w of the first filling slot 121 or that of the second filling slot 122.

The width of the opening of the first filling slot 121 and/or that of the second filling slot 122 is L4, and L4 satisfies $0.5σ≤L4≤4σ$, σ is a width of an air gap between an inner diameter of a stator and an outer diameter of a rotor in the electric motor including the rotor structure, and in some embodiments, the width L4 of the opening of the first filling slot 121 and/or that of the second filling slot 122 satisfies $1.5σ≤L4≤3σ$.

In some embodiments, the width L4 of the opening of the first filling slot 121 and/or that of the second filling slot 122 is ranged as: $0.1w≤L4≤0.7w$, wherein w is the maximum thickness of the first filling slot 121 or that of the second filling slot 122. In this way, through an appropriate width of the opening of the first filling slot 121 and/or the second filling slot 122 can be obtained, which is beneficial to achieve an optimum inductance difference of the electric motor in order to improve the electric motor efficiency.

Specifically, in a same second flux barrier layer 102, an area of the second filling slots 122 in the surface of the rotor sheet 100 is greater than 40% of a sum of an area of the second slot 112 and an area of the second filling slots 122 of the second flux barrier layer 102 in the surface of the rotor sheet 100.

In the same second flux barrier layer 102, the area of the second filling slots 122 is greater than 40% of the area of the corresponding second flux barrier layer 102. In some embodiments, the area of the second filling slots 122 is in a range from 40% to 60% of the area of the corresponding second flux barrier layer 102, so as to ensure that the electric motor has a sufficient self-starting capability.

Specifically, in a same first flux barrier layer 101, an area of the first filling slots 121 in the surface of the rotor sheet 100 is greater than 30% of a sum of an area of the first slot 111 and an area of the first filling slots 121 of the first flux barrier layer 101 in the surface of the rotor sheet 100.

In the same first flux barrier layer 101, the area of the first filling slots 121 is greater than 30% of the area of the corresponding first flux barrier layer 101. In some embodiments, the area of the first filling slots 121 is in a range from 30% to 100% of the area of the corresponding first flux barrier layer 101, so as to improve the loaded starting capability of the electric motor.

According to a second aspect of the present disclosure, an electric motor is provided, including a stator and a rotor. The rotor is the above-described rotor structure.

According to a third aspect of the present disclosure, a rotor manufacturing method is provided for manufacturing the above-described rotor structure. The rotor manufacturing method includes: preparing a rotor core having an outer peripheral surface larger than the outer peripheral surface of the rotor structure, so that temporary bars are formed between the openings of the filling slots of the rotor structure and the outer peripheral surface of the rotor core; filling the filling slots with a material to be filled and installing the end rings 200; and removing the temporary bars to form the rotor structure The rotor manufacturing method disclosed herein is specifically as follows:

First, a rotor core is manufactured. The outer peripheral surface of the rotor core is slightly larger in diameter than that of the rotor sheet 100 described above. At this time, the openings of the filling slots are sealed with the temporary bars provided at the corresponding openings of the filling slots. The temporary bars space the filling slots from the outer peripheral surface of rotor core.

Then, the filling slots are filled with the material, and the filled material are welded with the end rings 200 on both sides in the axial direction of the rotor core to form the squirrel cage structure.

Finally, by a machining method such as turning, the temporary bars are removed to form the openings of the filling slots to form the half-opened structure, thereby producing the rotor structure as shown in FIG. 1.

Figure 4:
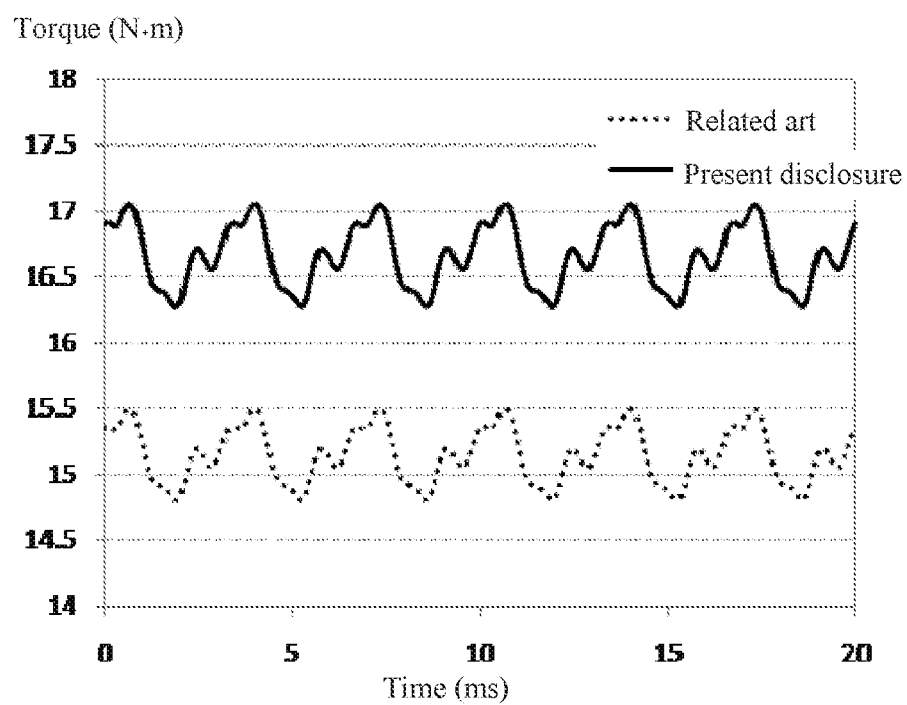
FIG. 4 shows a comparison graph of time-dependent output torques of an electric motor including the rotor structure of the present disclosure and an electric motor including a rotor structure according to related art.

As shown in FIG. 4, from the comparison graph between the time-dependent output torque of the electric motor including the rotor structure of the present disclosure and the time-dependent output torque of the electric motor including the rotor structure according to related art, it can be seen that the output torque of the electric motor including the rotor structure of the present disclosure has increased significantly compared with the output torque of the electric motor including the rotor structure of the prior art. The rotor structure of the present disclosure can increase the output torque of the electric motor.

In specific implementations of the present disclosure, the slot section 1110 and the adjacent first filling slot 121 are spaced from or connected to each other; the third flux barrier layer 103 can be an independent filling slot or a combination of a filling slot and a hollow slot; the slot section 1110 can be rectangular or have other regular or irregular shape; the shape of the shaft hole 20 can be completely circular or partially circular; the first filling slots 121 and the second filling slots 122 can be the open slots or the closed slots; when the first filling slots 121 and the second filling slots 122 are the open slots, the openings can be located at one side of the ends of the corresponding filling slots adjacent to the direct axis 3 or in the middles of the ends of the corresponding filling slots, or both.

From the above description, it can be seen that the above embodiments of the present disclosure realize the following technical effects.

(1) By setting the segmental first flux barrier layer 101 in the direction of the direct axis 3 of the rotor structure, the salient pole difference of the electric motor can be increased and the torque output capability of the electric motor can be improved.

(2) By filling the slot sections 1110 with the same filling material as that in the first filling slots 121, the area of the filling slots in the direct axis can be increased, the direct axis electrical resistance can be reduced, the average torque of the electric motor in the starting process can be increased, the starting capability of electric motor can be improved, and the utilization rate of the rotor core space can be increased.

(3) The self-starting of electric motor is realized by an asynchronous torque provided by rotor conducting bars (that is, the bar structure formed by the filling material in filling slots), which solves the problem that the synchronous reluctance electric motor needs a variable-frequency drive, reduces the loss of electric motor, improves the efficiency of the electric motor, and solves the problem of low efficiency of the electric motor in prior art.

Those described above are just embodiments of the present disclosure, rather than limitations thereto. For persons skilled in the art, various modifications and changes can be made to the present disclosure. Any modification, equivalent substitution, improvement, etc. made within the spirit and principle of the present disclosure shall fall within the protection scope of the present disclosure.

What is claimed is:

1. A rotor structure, comprising:
a plurality of rotor sheets stacked in sequence along an axial direction of the rotor structure, each of the plurality of rotor sheets is provided with a shaft hole, a first slot, and first filling slots at both ends of the first slot, the first slot extending in a direction of a direct axis of the rotor structure and comprising slot sections at opposite sides of the shaft hole; and
rotating shaft passing through the shaft hole of the plurality of rotor sheets,
wherein the first slot, the first filling slots, and the rotating shaft form a first flux barrier layer; a minimum distance L1 between each slot section and the shaft hole is ranged as: $\sigma \leq L1 \leq 5\sigma$, wherein $\sigma$ is a width of an air gap between an inner diameter of a stator and an outer diameter of a rotor in an electric motor comprising the rotor structure.

2. The rotor structure according to claim 1, wherein the rotor structure comprises two rotor poles arranged in pair; and/or
the rotating shaft is made of a magnetically non-conductive material; and/or
an outer peripheral surface of the rotating shaft is cylindrical, or the outer peripheral surface of the rotating shaft comprises a part of a cylindrical surface.

3. The rotor structure according to claim 1, wherein a minimum distance L2 between each slot section and an adjacent first filling slot is ranged as: $0.8\sigma \leq L2 \leq 2\sigma$, or L2=0.

4. The rotor structure according to claim 1, wherein the slot sections and the first filling slots are filled with a same material; or
the slot sections are air-filed slots.

5. The rotor structure according to claim 1, wherein the slot sections are rectangular; and/or
a minimum width h1 of the slot sections is ranged as: $0.9h2 \leq h1 \leq 1.1h2$, wherein h2 is a width of the first filling slots adjacent to the slot sections.

6. The rotor structure according to claim 1, further comprising
groups of second flux barrier layers located at opposite sides of the first flux barrier layer, wherein each of the groups of second flux barrier layers comprises a plurality of second flux barrier layers arranged in a direction of an quadrature axis of the rotor structure, and the plurality of second flux barrier layers each comprise a second slot and second filling slots disposed at both ends of the second slot.

7. The rotor structure according to claim 6, wherein a minimum width h1 of the slot sections is ranged as:

$$\frac{4}{25}L6 \leq \frac{1}{2}h1 \leq \frac{2}{5}L6,$$

wherein L6 is a minimum vertical distance in the direction of the quadrature axis between the second slot of a second flux barrier layer most adjacent to the direct axis in each of the groups of second flux barrier layers and the direct axis; and/or
a minimum distance h4 in the direction of the quadrature axis between the second slot of the second flux barrier layer most adjacent to the direct axis in each of the groups of second flux barrier layers and the first slot is ranged as: $L7 \leq h4 \leq 1.65L7$,
wherein L7 is a minimum distance in the direction of the quadrature axis between the shaft hole and the second flux barrier layer most adjacent to the direct axis.

8. The rotor structure according to claim 6, wherein in a same second flux barrier layer, the second slot and the second filling slots are disposed at intervals and a width L3 of each interval is ranged as: $0.8\sigma \leq L3 \leq 2\sigma$, wherein $\sigma$ is a width of an air gap between an inner diameter of a stator and an outer diameter of a rotor in an electric motor comprising the rotor structure; and/or
in a same second flux barrier layer, a difference between a maximum width of each second filling slot and a maximum width of the second slot is smaller than or equal to 10% of the maximum width of the second slot.

9. The rotor structure according to claim 6, wherein in each of the groups of second flux barrier layers, a minimum distance L5 between two adjacent second flux barrier layers is greater than 1.8h3, wherein h3 is a minimum width, in the direction of the quadrature axis, of the second slot of a smaller second flux barrier layer in the two adjacent second flux barrier layers.

10. The rotor structure according to claim 6, wherein a width of the second slot gradually increases from the quadrature axis to both ends of the second slot.

11. The rotor structure according to claim 6, further comprising:
a third flux barrier layer located at a side of each of the groups of second flux barrier layers away from the first flux barrier layer, wherein the third flux barrier layer comprises a third filling slot.

12. The rotor structure according to claim 11, wherein an angle a of the third filling slot occupied relative to a central axis of the rotor structure is ranged as: $0.05\tau \leq \alpha \leq 0.3\tau$, wherein $\tau=180°/p$, and p is a quantity of pole pairs of the rotor structure.

13. The rotor structure according to claim 6, wherein in each of the groups of second flux barrier layers, a ratio of a sum of widths of second slots of the plurality of second flux barrier layers to a width between the shaft hole and an outer peripheral surface of the rotor structure is in a range from 0.3 to 0.5.

14. The rotor structure according to claim 6, wherein both the first filling slots and the second filling slots extend to an outer peripheral surface of the rotor structure; and/or
the first filling slots and the second filling slots are both filled with aluminum metal or aluminum alloy.

15. The rotor structure according to claim 6, wherein openings of the first filling slots and the second filling slots are located at ends of the first filling slots and the second filling slots and at sides adjacent to the direct axis; or openings of the first filling slots and the second filling slots are located in middles of ends of the first filling slots and the second filling slots.

16. The rotor structure according to claim 6, wherein ends of the first filling slots and the second filling slots each comprise a beveled edge at a side away from the direct axis, or each comprise beveled edges at both sides of an end of each of the first filling slots or each of the second filling slots, the beveled edges are connected to edges of openings of the first filling slots and the second filling slots.

17. The rotor structure according to claim 16, wherein an angle between each of the beveled edges and a slot wall of the first filling slots or the second filling slots connected to the each of the beveled edges is $\beta$, and $125° \leq \beta \leq 165°$.

18. The rotor structure according to claim 6, wherein a width of each of openings of the first filling slots and/or the second filling slots is L4,
$0.5\sigma \leq L4 \leq 4\sigma$, $\sigma$ is a width of an air gap between an inner diameter of a stator and an outer diameter of a rotor in an electric motor comprising the rotor structure; and/or
the width L4 of the each of the openings of the first filling slots and/or the second filling slots is less than a maximum thickness w of the first filling slots or that of the second filling slots.

19. The rotor structure according to claim 6, wherein a width L4 of each of openings of the first filling slots and/or the second filling slots is ranged as: $0.1w \leq L4 \leq 0.7w$, wherein w is a maximum thickness of the first filling slots or that of the second filling slots.

20. An electric motor comprising a stator and the rotor structure according to claim 1.

* * * * *